(12) United States Patent  
Desta et al.

(10) Patent No.: US 6,698,554 B2
(45) Date of Patent: Mar. 2, 2004

(54) EDDY CURRENT BRAKE SYSTEM

(75) Inventors: Grima Gete Desta, Southfield, MI (US); Kevin Jerome Pavlov, Livonia, MI (US); Zhesheng Li, Detroit, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 100 days.

(21) Appl. No.: 10/032,178

(22) Filed: Dec. 21, 2001

(65) Prior Publication Data

US 2003/0116391 A1 Jun. 26, 2003

(51) Int. Cl.[7] .................................................. B60L 7/00
(52) U.S. Cl. ...................................................... 188/158
(58) Field of Search ................... 310/93, 105; 188/158, 188/161, 164

(56) References Cited

U.S. PATENT DOCUMENTS

| | | | |
|---|---|---|---|
| 4,853,573 A | * | 8/1989 | Wolcott et al. ............. 310/105 |
| 5,054,587 A | | 10/1991 | Matsui et al. |
| 5,154,623 A | | 10/1992 | Kuwahara |
| 5,219,050 A | | 6/1993 | Kubomiya |
| 5,234,177 A | * | 8/1993 | Maji et al. ................ 242/75.47 |
| 5,485,901 A | * | 1/1996 | Akima et al. ................ 188/164 |
| 5,847,481 A | | 12/1998 | Rugraff |
| 6,253,885 B1 | * | 7/2001 | Tsai et al. .................... 188/158 |
| 6,557,673 B1 | * | 5/2003 | Desta et al. ................. 188/271 |

* cited by examiner

Primary Examiner—Christopher P. Schwartz
(74) Attorney, Agent, or Firm—Brinks Hofer Gilson & Lione

(57) ABSTRACT

An eddy current brake or retarder device for bringing a vehicle to rest is disclosed. The device includes a stator mounted to a frame of the vehicle, a plurality of poles disposed along a perimeter of the stator, a plurality of coils each wound about each of the plurality of poles, wherein an adjacent pair of poles form an electromagnet when the coil is energized, and a rotor in communication with a transmission axle of the vehicle and located concentric with the stator. A relative rotation of the rotor with respect to the stator produces eddy currents between the poles of the stator and an outer surface of the rotor, causing the rotor to come to a rest.

17 Claims, 4 Drawing Sheets

EDDY CURRENT BRAKE SYSTEM

TECHNICAL FIELD OF THE INVENTION

The present invention relates to braking systems for road vehicles, especially braking systems including an eddy current brake for generating eddy currents to retard the rotation of a vehicle's axle.

BACKGROUND ART

Eddy current braking systems typically include a rotor mounted to a rotatable shaft, such as a vehicle axle and a magnetic power source, such as an electromagnet or a permanent magnet fixed to a vehicle frame. Eddy currents are produced in the rotor due to a relative velocity difference between the rotor and the stationary magnetic power source. The eddy currents generate a braking force retarding the rotation of the rotor, thereby decelerating the vehicle.

While prior art eddy current braking systems achieve their intended purpose, many problems still exist. For example, prior art eddy current braking systems typically, are unable to generate the required braking torque to stop a vehicle, hence these systems are only used in conjunction with conventional friction brake systems. Thus, conventional eddy current braking systems add significant cost to the vehicle without providing significant improvements in brake performance, reduction in brake wear and an increase in customer satisfaction.

Therefore, there is a need for a new and improved eddy current braking system for a motor vehicle. The new and improved eddy current braking system should be capable of generating the total required braking torque to bring a motor vehicle to rest, such that the eddy current braking system is able to replace conventional frictional braking systems.

SUMMARY

In an aspect of the present invention, an eddy current brake or retarder device for bringing a vehicle to rest is provided. The device includes a stator, a plurality of poles, a plurality of coils, and a rotor. The stator is mounted to a frame of the vehicle. The plurality of poles are disposed along a perimeter of the stator. The plurality of coils wherein each of the plurality of coils are wound about each of the plurality of poles. Moreover, an adjacent pair of poles are electrically connected to form an electromagnet when the coil is energized. The rotor is in communication with a transmission axle of the vehicle and located concentric with the stator, and wherein a relative rotation of the rotor with respect to the stator produces eddy currents between the poles of the stator and an outer surface of the rotor, causing the rotor to come to a rest.

In another aspect of the present invention, an end plate is located at an end of each of the plurality of poles.

In another aspect of the present invention, the end plate has a plurality of grooves disposed in a top surface of the end plate to form a plurality of sub-poles.

In another aspect of the present invention, the coil is comprised of a flat wire.

In another aspect of the present invention, a gear box is in communication with the axle and the rotor for transmitting torque to the axle and to allow the axle to rotate at a lower rotational speed than the rotor.

In another aspect of the present invention, the gear box has, approximately, a 3 to 1 ratio allowing the axle to rotate at a third of the speed of rotation as the rotor.

In another aspect of the present invention, the rotor has a plurality of vanes disposed on an inside surface of the rotor, wherein the vanes draw air into the device as the rotor is rotating to cool the device.

In another aspect of the present invention, the rotor further comprises a pair of rotor end plates which enclose a first and second end of the rotor.

In another aspect of the present invention, the pair of rotor end plates include a plurality of vent holes for drawing air into and cool the device.

Further aspects, features and advantages of the invention will become apparent from consideration of the following erudite description and the appended claims when taken in connection with the accompanying drawings.

DETAILED DESCRIPTION OF THE PREFERRED EMBODIMENT

Figure 1:
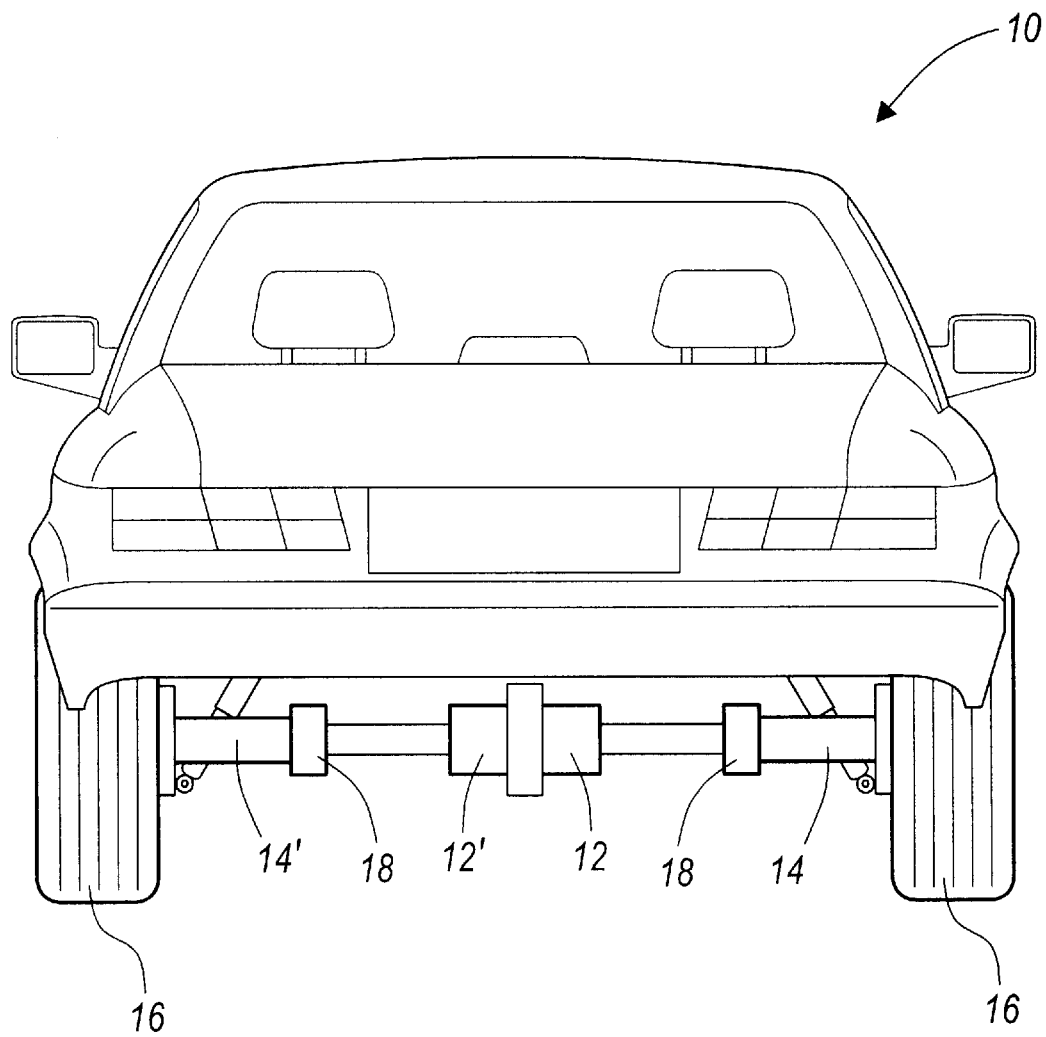
FIG. 1 is a perspective view of the eddy current brake device mounted to a vehicle, in accordance with the present invention.

Referring now to FIG. 1, a partial cut-away view of a vehicle 10 (viewed from the rear of the vehicle) is illustrated having an eddy current brake or retarder 12 mounted to the underside of vehicle 10, in accordance with the present invention. An output end 13 of the eddy current retarder 12 is in communication with a wheel axle 14 having a wheel 16 rotationally mounted thereto. As is conventionally known, a bearing 18 or a plurality of bearings, as required, are provided along axle 14 to secure the axle to the vehicle's frame 15. As shown, in FIG. 1, an additional eddy current retarder 12' may be mounted to eddy current retarder 12 to provide a means to decelerate another wheel axle 14' of vehicle 12. Preferably, eddy current retarder 12 and 12' are mounted to a vehicle's non-drive wheels 16, thus for a front wheel drive vehicle, eddy current retarders 12 and 12' would be mounted to a vehicle's rear axles, and for a rear wheel drive vehicle, eddy current retarders 12 and 12' would be mounted to a vehicle's front axles.

Figure 2A:
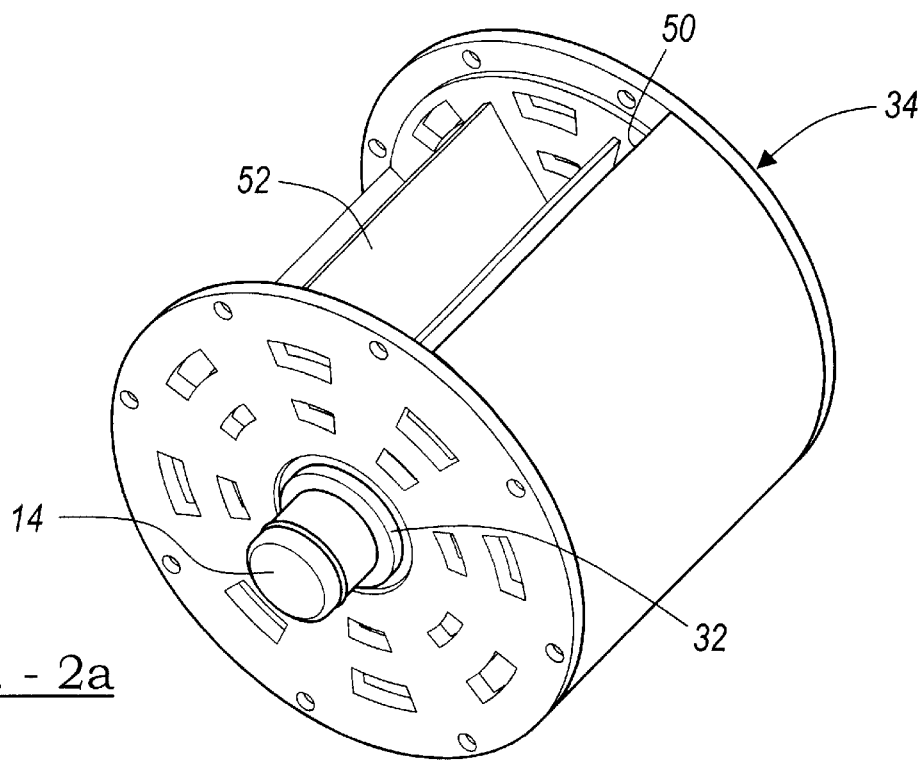
FIGS. 2a–2b are perspective and end views of the rotor and stator of the eddy current brake retarder of the present invention.
Figure 2B:
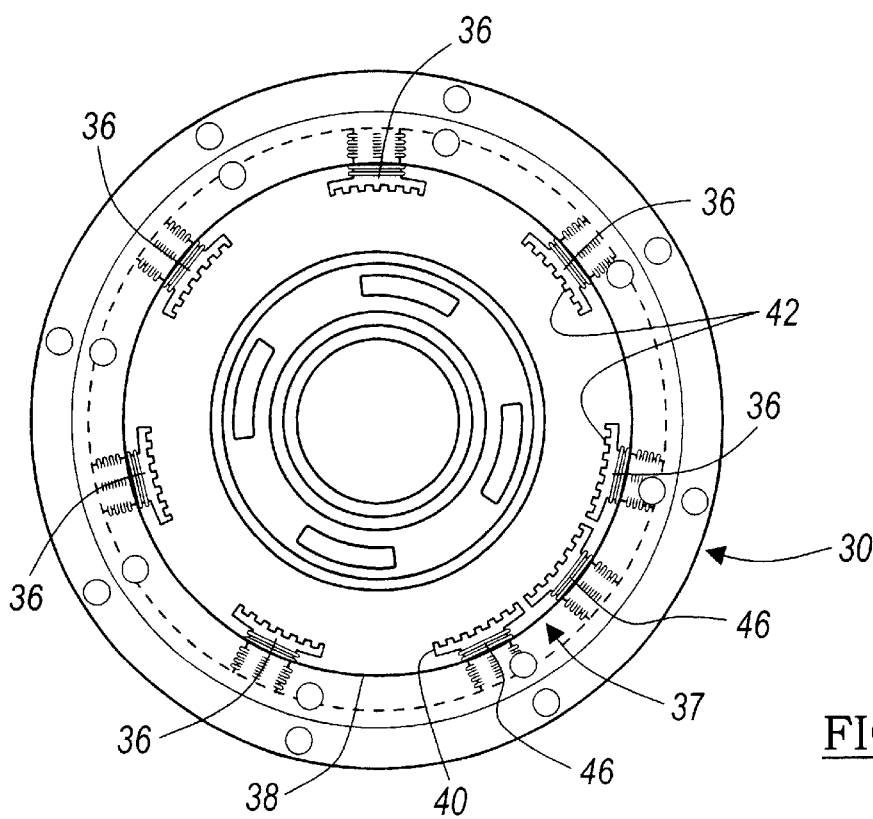

Referring now to FIGS. 2a and 2b, perspective and end views of eddy current retarder 12 is illustrated in greater detail, in accordance with the present invention. Eddy current brake retarder 12 includes a stator 30 mounted to vehicle frame 15, a gear box 32 mounted to a wheel axle 14, and a rotor 34 mounted to gear box 32 and rotatable therewith. Stator 30 of eddy current retarder 12 includes a plurality of poles 36 disposed on an inner surface 38 of stator 30 and about the entire perimeter of stator 30. Each pole 36 includes an end plate 40 having a plurality of sub poles 42. In a preferred embodiment sub-poles 42 are created in end plate 40 by cutting grooves in a top surface of end plate 40, thereby creating ridges (sub-poles) and valleys. The presence of the sub-poles creates two distinct magnetic field components. The first component is generated from the main pole field and induces low frequency eddy currents. The second component is generated by the plurality of sub-poles and induces high frequency eddy currents in the surface of the rotor. Further, the second component is characterized by smaller penetration and exhibits high Joules heating. Accordingly, the sub-poles has the advantage of decreased magnetic flux and saturation, which will result in decreased inductance and time constant without decreasing braking torque.

Each pole 36 is wrapped with a flat wire 44 to create a coil or winding 46. Pole 36 together with coil 46 create an electromagnet when coil 46 is energized, as will be described in greater detail hereinafter. Each adjacent pair of poles are electrically connected to form a U-shaped electromagnet 37.

Gear box 32 provides, for example approximately a 3 to 1 speed reduction from the rotor to the wheel axle. Thus, rotor 34 being mounted to the gear box 32 is rotating approximately three times faster than the axle. Of course, other gearboxes having different gear ratios may be used. The higher rotational speed of the rotor greatly increases power density and improves the retarder's braking torque characteristics.

Rotor 34 has an inner surface 50. A plurality of cooling fins or vanes 52 are attached around the entire inner surface. Cooling vents 54 extend generally inwardly and are configured to draw air into rotor 34 and through eddy current retarder 12 thereby cooling same.

Figure 3:
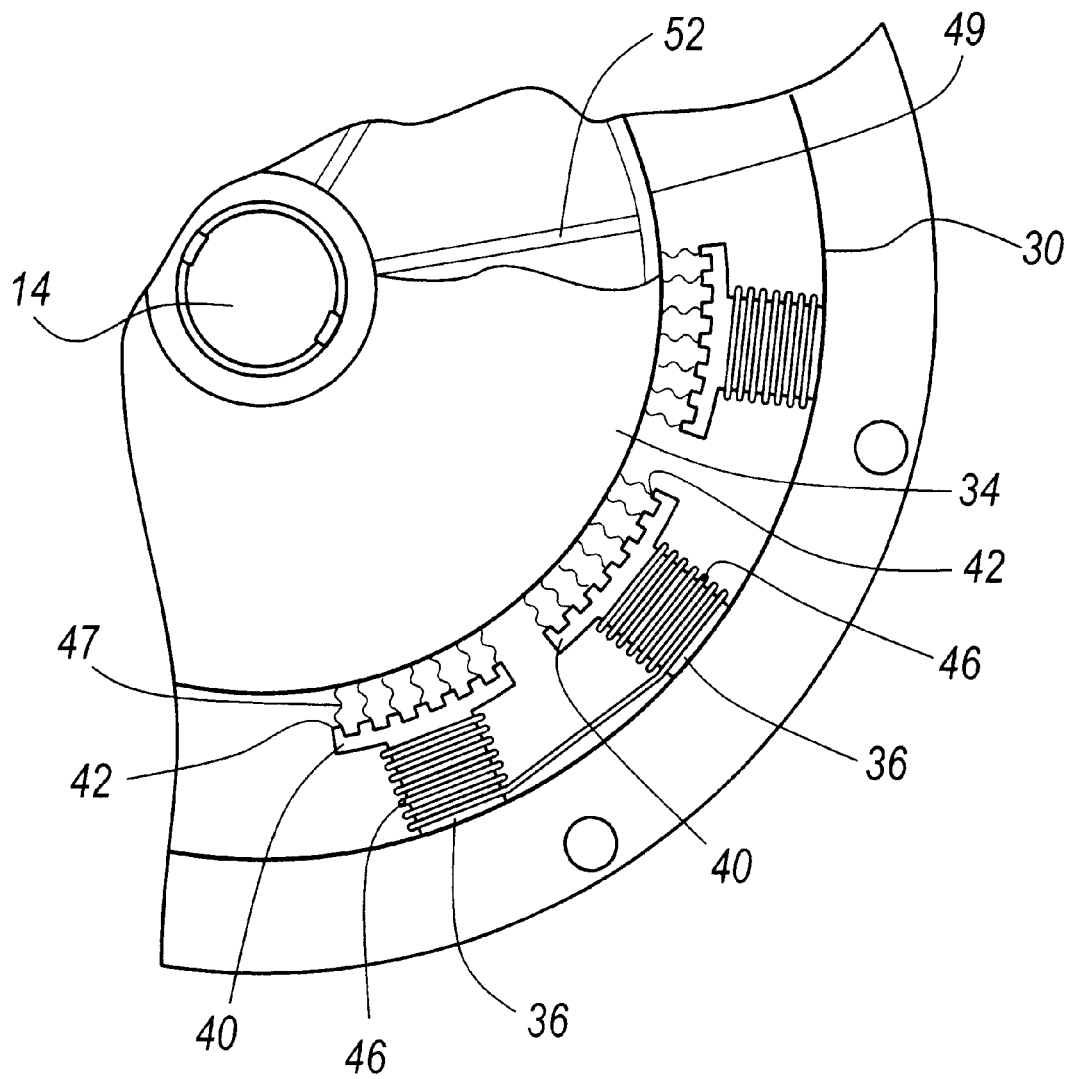
FIG. 3 is partial view of the eddy current retarder illustrating the interaction of the stator and the rotor, in accordance with the present invention.
Figure 4A:
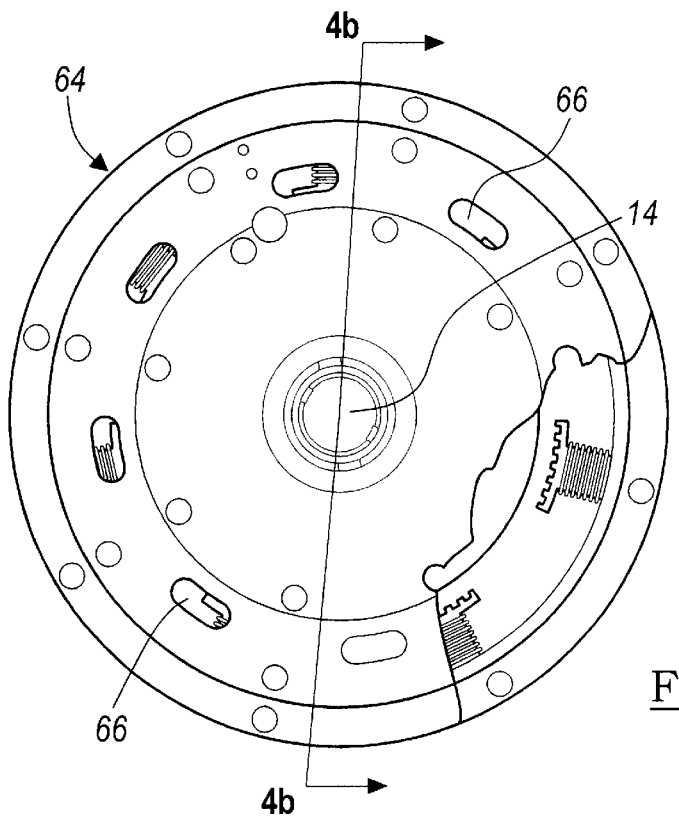
FIGS. 4a–4b are end and cross-sectional views of a completely assembled eddy current retarder for retarding the rotation of a vehicle's wheel axle, in accordance with the present invention.
Figure 4B:
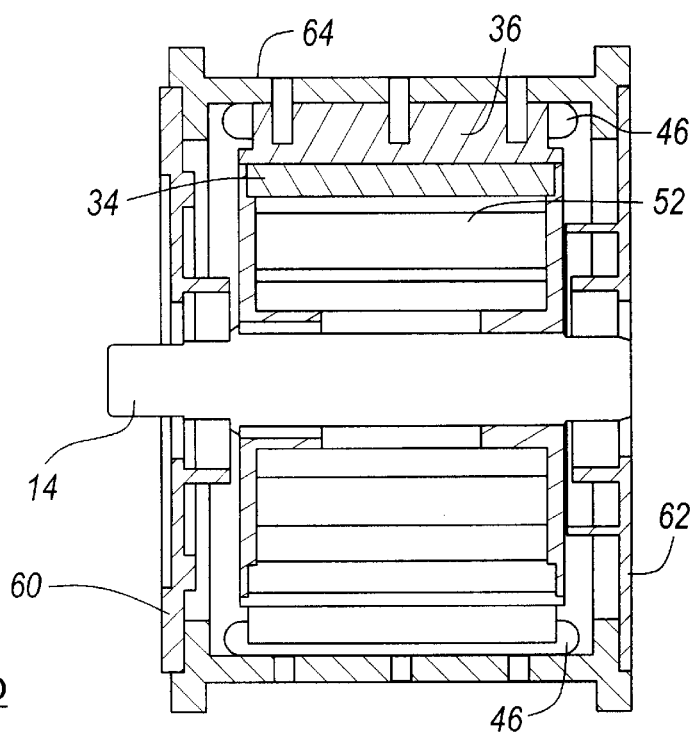

Referring now to FIGS. 3, 4a and 4b the operation of eddy current retarder 12 will now be described, in accordance with the present invention. Upon energizing windings 46, electromagnet 37 is created and a magnetic flux field 47 is generated between an outer surface 49 of rotor 34 and end plate 40 of pole 36. Upon rotation of rotor 34, eddy currents are generated by the relative movement of rotor 34 with respect to stator 30. The creation of magnetic flux field 47 and generation of eddy currents produces Lorenz forces that act to retard the rotation of rotor 34. The generation of the eddy currents creates a substantial amount of heat in retarder 12. The heat is dissipated through cooling fins 52.

As shown in FIG. 4, a first end plate 60, a second end plate 62 and a housing 64 enclose eddy current retarder 12. The first end plate 60 has a plurality of cooling holes 66 which may be ovular in shape for example. Air is drawn in through cooling holes 66 by the rotation and configuration of rotor 34 and cooling fins 52. A second end plate 62 essentially identical to first end plate 60, also includes cooling holes 66. As rotor 34 and cooling fins 52 draw in air through cooling holes 66 air is forced out of second end plate 62 and through the cooling holes disposed therein. The eddy current brake retarder 12 as described above, typically can generate 3000 Newton-meters of braking torque at a rotor speed of 1000 rpm.

Therefore, the eddy current brake retarder of the present invention has many advantages and benefits over prior art eddy current retarders. For example, retarder 12 uses the sub poles and pulse width modulation (PWM) of the excitation current to achieve a relatively higher response rate. Torque rise times of 27.8 ms are achievable with the retarder of the present invention. Thus, eddy current retarder 12 develops sufficient braking torque to replace conventional braking systems and become the primary braking system.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. An eddy current brake device for bringing a vehicle to rest, the device comprising:

a stator mounted to a frame of the vehicle;

a plurality of poles disposed along a perimeter of the stator;

a pole plate member disposed at an end of each of the plurality of poles, wherein the pole plate member has a plurality of grooves disposed in a top surface of the pole plate member;

a plurality of coils, wherein each of the plurality of coils are wound about each of the plurality of poles, wherein an adjacent pair of poles and coils form an electromagnet when each of the plurality of coils are energized; and a rotor in communication with a transmission axle of the vehicle and located concentric with the stator, and wherein a relative rotation of the rotor with respect to the stator produces eddy currents between the plurality of poles of the stator and an outer surface of the rotor, causing the rotor to stop rotating relative to the stator.

2. The device of claim 1, further comprising a gear box in communication with the axle and the rotor for transmitting torque to the axle and to allow the axle to rotate at a lower rotational speed than the rotor.

3. The device of claim 2, wherein the gear box has approximately a 3 to 1 ratio allowing the axle to rotate at a third of the speed of rotation of the rotor.

4. The device of claim 1, wherein the rotor further comprises a pair of rotor end plates which enclose a first and second end of the rotor.

5. The device of claim 4, wherein the pair of rotor end plate includes a plurality of vent holes for drawing air into the device.

6. The device of claim 1, wherein the coil is comprised of a flat wire.

7. The device of claim 1, wherein the rotor has a plurality of vanes disposed on an inside surface of the rotor, wherein the vanes draw air into the device as the rotor is rotating to cool the device.

8. An eddy current brake device for bringing a vehicle to rest, the device comprising:

a stator mounted to a frame of the vehicle;

a plurality of poles disposed along a perimeter of the stator;

an end plate located at an end of each of the plurality of poles, wherein the end plate has a plurality of grooves disposed in a top surface of the end plate, forming a plurality of sub-poles;

a plurality of coils, wherein each of the plurality of coils are wound about each of the plurality of poles, wherein an adjacent pair of poles form an electromagnet when the coil is energized; and a rotor in communication with a transmission axle of the vehicle and located concentric with the stator, and wherein a relative rotation of the rotor with respect to the stator produces eddy currents between the poles of the stator and an outer surface of the rotor, causing the rotor to come to a rest, and wherein the rotor has a plurality of vanes disposed on an inside surface of the rotor, wherein the vanes draw air into the device as the rotor is rotating to cool the device.

9. The device of claim 8, further comprising a gear box in communication with the axle and the rotor for transmitting torque to the axle and to allow the axle to rotate at a lower rotational speed than the rotor.

10. The device of claim 9, wherein the gear box has approximately a 3 to 1 ratio allowing the axle to rotate at a third of the speed of rotation of the rotor.

11. The device of claim 8, wherein the rotor further comprises a pair of rotor end plates which enclose a first and second end of the rotor.

12. The device of claim 11, wherein the pair of rotor end plate includes a plurality of vent holes for drawing air into the device.

13. The device of claim 8, wherein the coil is comprised of a flat wire.

14. An eddy current brake device for bringing a vehicle to rest, the device comprising:

a stator mounted to a frame of the vehicle;

a plurality of poles disposed along a perimeter of the stator;

an end plate located at an end of each of the plurality of poles, wherein the end plate has a plurality of grooves disposed in a top surface of the end plate, forming a plurality of sub-poles;

a plurality of coils, wherein each of the plurality of coils are wound about each of the plurality of poles, wherein an adjacent pair of poles form an electromagnet when the coil is energized;

a rotor in communication with a transmission axle of the vehicle and located concentric with the stator, wherein the rotor has a plurality of vanes disposed on an inside surface of the rotor and wherein the vanes draw air into the device as the rotor is rotating to cool the device and wherein the rotor further comprises a pair of rotor end plates which enclose a first and second end of the rotor; and a gear box in communication with the axle and the rotor for transmitting torque to the axle and to allow the axle to rotate at a lower rotational speed than the rotor, and wherein a relative rotation of the rotor with respect to the stator produces eddy currents between the poles of the stator and an outer surface of the rotor, causing the rotor to come to a rest.

15. The device of claim 14, wherein the coil is comprised of a flat wire.

16. The device of claim 14, wherein the gear box has approximately a 3 to 1 ratio allowing the axle to rotate at a third of the speed of rotation of the rotor.

17. The device of claim 14, wherein the pair of rotor end plate includes a plurality of vent holes for drawing air into the device.

* * * * *